April 15, 1958 M. H. FENNIMORE ET AL 2,830,695
FLEXIBLE SCREW CONVEYOR
Filed Dec. 16, 1955
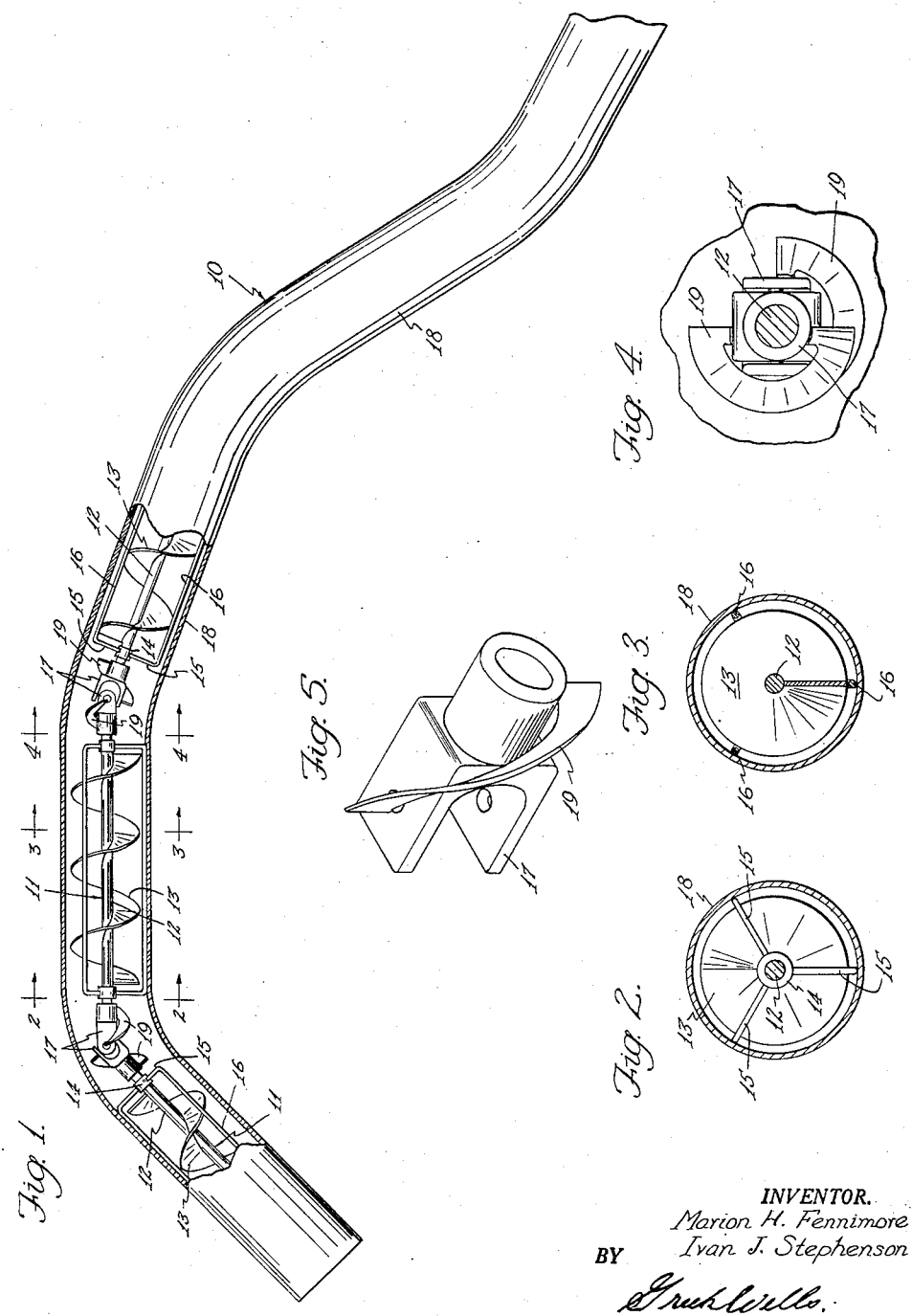
INVENTOR.
Marion H. Fennimore
Ivan J. Stephenson
BY
Atty.

United States Patent Office 2,830,695
Patented Apr. 15, 1958

2,830,695

FLEXIBLE SCREW CONVEYOR

Marion H. Fennimore and Ivan J. Stephenson, La Crosse, Wash.

Application December 16, 1955, Serial No. 553,490

7 Claims. (Cl. 198—213)

The present invention relates to improvements in flexible screw type conveyors.

In handling bulk materials such as grain and the like, screw or auger conveyors are frequently used. However, in certain circumstances there is no open path between the point where the material is located, and the point to which it is to be transported. In such circumstances normal screw conveyors cannot be used.

It is the principal purpose of this invention to provide a flexible screw conveyor which may be bent around, over, or under obstacles existing in the path of transportation.

A further purpose of the invention is to provide such a device having a plurality of universally connected short auger sections inserted in a flexible tube and rotatably supported therein, whereby to provide for substantial flexibility without impairment of conveying ability.

More specifically the invention consists in making a portable bendable screw conveyor system by connecting a plurality of short screw conveyor or auger sections end to end by universal joint members which themselves include auger portions, providing open cage supports for the individual sections, which supports have bearings for the screw sections so that each support is free to turn with respect to an endwise adjacent support on the same axis that the screw section rotates, the supports being confined in a relatively stiff flexible tube by friction only, whereby the several supports may adjust themselves in bending of the tube to get around obstructions.

The nature and advantages of the invention will appear more clearly from the following description and the accompanying drawings wherein a preferred form of the invention is shown. It should be understood, however, that the description and drawings are illustrative only, and are not intended to limit the invention except insofar as it is limited by the claims.

In the drawings:

Figure 1 is an elevational view of the invention with a portion of the tube broken away;

Figure 2 is an enlarged sectional view taken on the line 2—2 of Figure 1;

Figure 3 is an enlarged sectional view taken on the line 3—3 of Figure 1;

Figure 4 is an enlarged sectional view taken on the line 4—4 of Figure 1; and

Figure 5 is a perspective view of one of the universal joint members, illustrating the spiral fin thereon.

Referring now to the drawings, our invention as shown in Figure 1, provides a portable flexible screw or auger type conveyor generally indicated at 10, which may be bent as desired to travel around corners and over obstacles in order to carry bulk materials from one place to another. The conveyor 10 comprises a plurality of short auger sections 11, each of which is composed of a drive shaft 12 with a helical auger blade 13 fixed thereto. As shown in Figure 1, the shaft 12 extends outwardly at each end beyond the ends of the blade 13. Bearing members 14 are rotatably mounted on the shaft 12 at each end of the blade 13. Each of the bearing members 14 has a plurality of radial rods 15 secured thereto. The rods 15 extend outwardly and are slightly longer than the radius of the auger 11. The radial rods 15 at each end of the auger section 11 are connected by longitudinal rods 16 which are equally spaced around the circumference of the auger 11. The rods 15 and 16 together with the bearings 14 comprise a cage surrounding each auger section 11, and supporting it for free rotation therein.

As hereinbefore described, there are a plurality of the auger sections 11. Each of these sections 11 and their surrounding cages of rods 15 and 16, are placed end to end.

The adjacent ends of the shafts 12 extending beyond the bearings 14 are fitted with short universal joint members 17 such as the one shown in Figure 5. The universal joint members 17 are attached together in the usual manner to provide for transmission of rotational power from one section 11 to the next. Power is supplied to the series of connected sections 11 by a motor or other power supply means (not shown) to the section 11 at either end of the series.

A semi-flexible tube 18 is provided around the auger sections 11 as shown in Figures 1, 2 and 3. The tube 18 may be made of any suitable semi-flexible material that will hold its circular shape. It may be a flexible metal pipe, of construction similar to the well known electrical conduit material, which is made of a strip of metal wound spirally with adjacent spirals interengaged.

As shown in Figure 1, a considerable space exists between each of the auger sections 11 within the tube 18. Due to the pressure of material being fed by the auger section 11 immediately behind each of these intermediate spaces, the material being conveyed will be forced into engagement with the next auger section 11 so that the spaces do not entirely defeat the operation of the conveyor 10. However, these spaces will cause a slowing down and piling up of the material, and will hamper the operation to some extent. In order to reduce this tendency to a minimum, each of the universal joint members 17 is provided with a spiral fin 19 which will, when the member 17 is rotated, propel the material being conveyed through the intermediate space between the sections 11. These fins 19, best shown in Figures 4 and 5, are strips of metal bent into a spiral form and fixed onto the universal joint members 17, as shown. The fin 19 substantially encompasses the space from the trunnion pivots to the attaching end of the member 17.

As shown in Figure 1, the bending of the conveyor 10 occurs adjacent the universal joint members 17. When the conveyor 10 is bent, the members 17 shift toward the outside of the tube bend, because the tube curves and the members 17 pivot about their trunnion ends. In order to permit substantial deflection of the conveyor without rubbing the walls of the tube 18, the spiral fins 19 on the universal joint members 17 must be only about one-half as wide radially as the helical blades 13.

The auger sections 11 are prevented from moving out of concentric alignment with the tube 18, and are supported within the tube 18 by the cages formed of the rods 15 and 16. As shown in Figures 2 and 3, the longitudinal rods 16 engage the tube 18 to properly position the auger sections 11. The rods 16 are not, however, fixed to the tube 18 in any way and may slide endwise within the tube 18 to expose the auger sections 11 when repairs are needed. Also, since it is sometimes desirable to clean the conveyor 10 to prepare for handling a different type of material, the auger sections 11 may be pulled from the tube 18 for easy access.

One of the most difficult problems encountered with conveyors having flexible sections therein is that of bunching or folding of the flexible tubing at the inside of a bend. Such folding tends to restrict the flow of material within the tube. With the construction just described, this problem has been substantially overcome. Since the rods 16 are not fixed with respect to the tube 18, and since the whole length of the tube is of flexible material, the bunching or folding of the tube is substantially overcome. When bending occurs, the portion of the tube wall at the inside of the bend which normally resides between two auger sections 11 is not required to remain between the sections upon bending. Since the rods 16 may move endwise in the tube 18, those rods 16 on adjacent sections 11 which approach each other may slide in the tube slightly, instead of bunching the tube between them. Some compression of the wall of the tube at the inside of the bend may occur throughout a considerable length of the wall. In this way, those portions of the tube surrounding the two auger sections 18 between which bending occurs, may accept some of the strain accompanying bending. Thus the stretching and compressing of the tube 18 is not restricted to a small space, and its effectiveness is increased.

It is believed that the nature and advantages of our invention appear clearly from the foregoing description.

Having thus described our invention, we claim:

1. A flexible screw type conveyor comprising a plurality of short auger sections, each auger section having a drive shaft extending axially at each end, said auger sections arranged end to end, flexible driving means connecting the adjacent drive shafts, cages surrounding said auger sections, bearing members on said cages and rotatably mounting said auger sections within the cages, and a flexible tube receiving said cages for free endwise sliding movement with respect thereto.

2. A flexible screw type conveyor comprising a plurality of short auger sections, each auger section having a drive shaft extending axially at each end, said auger sections arranged end to end, flexible drive means connecting adjacent drive shafts, spiral fin members secured on said flexible drive means whereby to feed material from one auger section to the next adjacent auger section, cages surrounding said auger sections, bearing members on said cages and rotatably mounting said auger sections within the cages, and a flexible tube receiving said cages for free endwise sliding movement therein.

3. A flexible screw type conveyor comprising a plurality of short auger sections, each section having a drive shaft extending axially at each end, bearing members rotatably mounted on the drive shafts at each end of the auger sections, radial rods extending outwardly from said bearings, longitudinal rods extending between the radial rods at each end of the auger sections, said longitudinal rods being spaced outwardly of the auger sections, said sections being arranged end to end, universal joint members connecting adjacent drive shafts whereby to transmit torque from one to another and permit angular disposition between said auger sections, and a flexible tube slidably receiving said auger sections, the longitudinal rods and radial rods rotatably supporting said sections inwardly of the walls of the tube.

4. A flexible screw type conveyor comprising a plurality of short auger sections, each section having a drive shaft extending axially at each end, bearing members rotatably mounted on the drive shafts at each end of the auger sections, radial rods extending outwardly from said bearings, longitudinal rods extending between the radial rods at each end of the auger sections, said longitudinal rods being spaced outwardly of the auger sections, said sections being arranged end to end, universal joint members connecting adjacent drive shafts whereby to transmit torque from one to another and permit angular disposition between said auger sections, spiral fins secured to the universal joint members whereby to feed material from one auger section to the next adjacent section, and a flexible tube slidably receiving said auger sections, the longitudinal rods and radial rods rotatably supporting said sections inwardly of the walls of the tube.

5. A flexible screw type conveyor comprising a plurality of short auger sections, each section having a drive shaft extending axially at each end, bearing members rotatably mounted on the drive shafts at each end of the auger sections, radial rods extending outwardly from said bearings, longitudinal rods extending between the radial rods at each end of the auger sections, said longitudinal rods being spaced outwardly of the auger sections, said sections being arranged end to end, universal joint members connecting adjacent drive shafts whereby to transmit torque from one to another and permit angular disposition between said auger sections, spiral fins secured to said universal joint members whereby to feed material from one auger section to the next adjacent section, a flexible tube receiving the auger sections, the longitudinal rods and radial rods rotatably supporting said sections inwardly of the walls of the tube, the longitudinal rods slidably engaging the walls of the tube to permit endwise movement between the rods and the walls of the tube upon bending whereby to prevent folding of the tube between adjacent auger sections which are angularly displaced, and the distance from the center of the drive shafts to the outer edges of the spiral fins being less than the distance from the center of the shafts to the outer edge of the auger sections whereby to prevent engagement of the fins with the tube walls upon bending.

6. A flexible screw type conveyor comprising a plurality of auger sections, flexible drive means connecting said auger sections whereby to transmit torque from one to another and to permit angular displacement between adjacent auger sections, an open cage surrounding each of said auger sections and having bearing means thereon rotatably supporting the auger section within the cage, and a flexible tube receiving said cages for free sliding movement therein.

7. A flexible screw type conveyor comprising a plurality of auger sections, flexible drive means connecting said auger sections whereby to transmit torque from one to another and to permit angular displacement between adjacent auger sections, open cage means surrounding each of said auger sections and having bearing means thereon rotatably supporting the auger sections within the cage means, a flexible tube receiving said cage means, and said cage means including means engaging the flexible tube for free axial sliding movement therein whereby to support the cages in the tube for free axial movement with respect thereto.

References Cited in the file of this patent
UNITED STATES PATENTS

| | | |
|---|---|---|
| 796,477 | Wallace | Aug. 8, 1905 |
| 1,710,759 | Wunderlich | Apr. 30, 1929 |
| 2,266,650 | Matheis | Dec. 16, 1941 |
| 2,310,923 | Bean | Feb. 16, 1943 |